J. W. CRUZAN.
ENGINE CYLINDER.
APPLICATION FILED MAR. 25, 1913.

1,080,894.

Patented Dec. 9, 1913.

Witnesses:
John Enders
Henry A. Parks

Inventor:
Joseph W. Cruzan
by Sheridan, Wilkinson, Scott & Richmond
Attys.

UNITED STATES PATENT OFFICE.

JOSEPH W. CRUZAN, OF MATTOON, ILLINOIS.

ENGINE-CYLINDER.

1,080,894.   Specification of Letters Patent.   Patented Dec. 9, 1913.

Application filed March 25, 1913. Serial No. 756,638.

*To all whom it may concern:*

Be it known that I, JOSEPH W. CRUZAN, a citizen of the United States, residing at Mattoon, in the county of Coles and State of Illinois, have invented certain new and useful Improvements in Engine-Cylinders, of which the following is a specification.

This invention relates to improvements in engine cylinders, and has for its object to provide an improved cylinder, in which the reciprocating piston rod may be securely packed and lubricated.

In present-day steam engine practice, especially in the case of high-powered locomotives, the super-heated steam is almost altogether utilized, the same being supplied to the engine cylinder at approximately six hundred degrees temperature. This tends to heat all metal parts to an excessive degree. As will be explained later, the usual packing construction employed to prevent leakage of steam around the reciprocating piston rod consists of metal rings, or rings partially formed of metal, the same being comparatively soft, to reduce friction and to closely fit the reciprocating rod. The friction engendered between the rod and these metal packing rings, coupled with the excessive heat of the super-heated steam, tends to abnormally heat the rings, so that very often they melt and thereby permit the escape of steam from the cylinder, which is not only detrimental to the operation of the locomotive, but also dangerous.

By my construction I prevent the raising of the temperature of the contacting points beyond a safe point, and I also provide for lubricating means to reduce the friction engendered.

Other objects will be set forth and made apparent in the following specification and accompanying drawings, in which—

Figure 1:
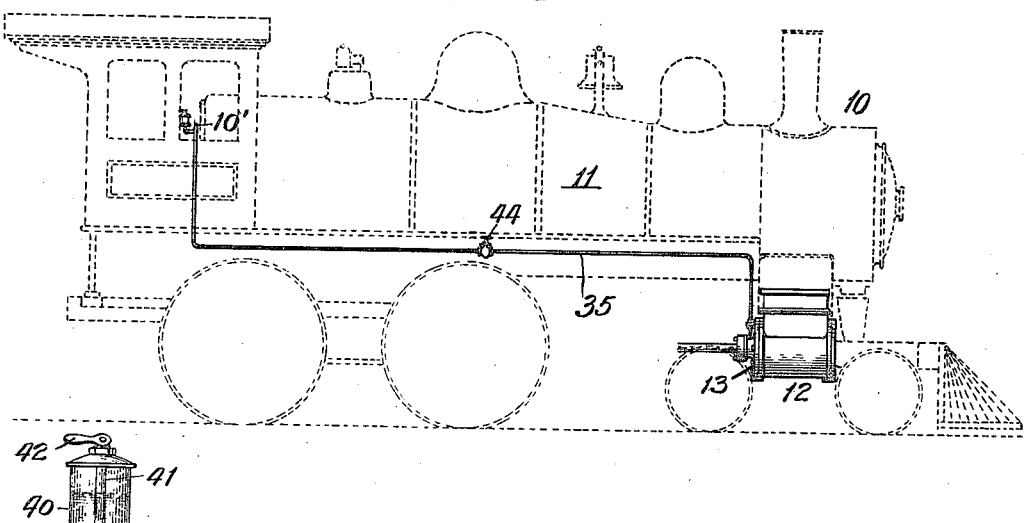
Figure 2:
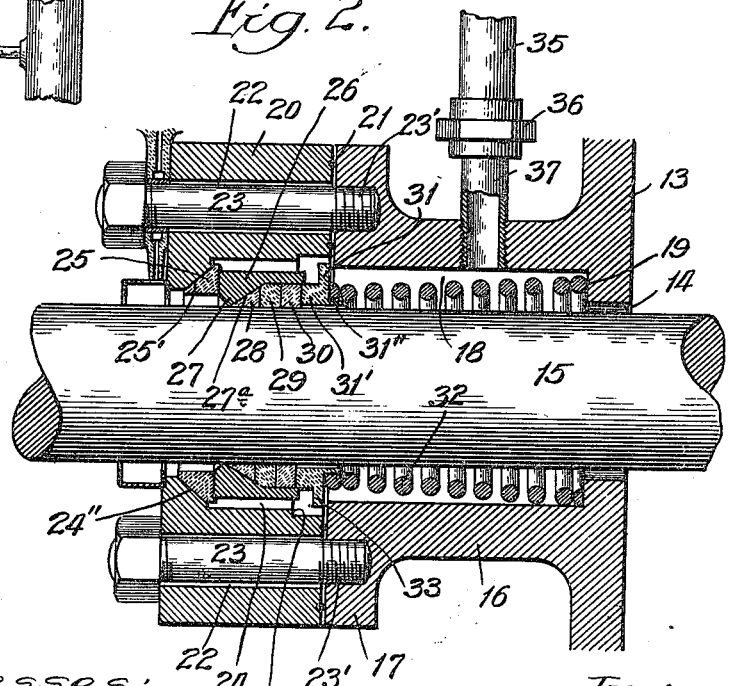

Figure 1 is a side elevation of an engine cylinder, showing my invention applied thereto, the engine being indicated diagrammatically; and Fig. 2 is a vertical section, showing the details of the piston rod packing and my cooling and lubricating device.

Like numerals refer to like elements throughout the drawings, in which—

10 designates generally the locomotive having the usual steam boiler, 11.

12 designates the engine cylinder, having the cylinder-head 13 secured to one end thereof. This head 13 is provided with the aperture 14 therein, through which is adapted to project the piston rod 15. This aperture 14 is of such diameter as to permit reciprocation therein of the piston rod 15, without contacting therewith, but at the same time is as small as possible to prevent, as much as possible, the admission of steam therethrough.

The cylinder head, 13, is provided with an outwardly projecting sleeve portion, 16, having the bolting flange, 17, at its outer portion, and provided with the chamber 18 therein, of greater diameter than that of the opening, 14, whereby a shoulder, 19, is formed, as shown in Fig. 2.

The packing gland, 20, is located outwardly of the sleeve portion, 16, and has one face in contact with the flange 17 thereof. Wire packing rings, 21, of soft wire, are located between the contacting faces of the gland, 20, and flange 17, being located approximately concentrically with respect to the chamber, 18. The gland 20 is provided with the bolting apertures, 22, and bolts 23, are inserted therein and have threaded ends, 23, threadably engaging the bolting flange, 17, of the sleeve portion, 16. As will be apparent, these bolts may be utilized to draw the gland, 20, into close contact with the sleeve portion, 16, of cylinder head, 13. Located in alinement with the chamber, 18, and formed in the gland, 20, is the aperture 24, having the shoulder, 24′ adjacent one extremity, and the chamfered or inclined shoulder 24″ with a slightly inclined concave surface, adjacent the opposite extremity. A ring, 25, is provided with the partially spherical surface, 25′, contacting with the concave surface 24″, forming a ball and socket joint therewith.

What is termed a vibrating cup, 26, has one extremity in contact with the rear face of the ring, 25. This vibrating cup is provided with the inwardly projecting V portion, 27, closely fitting around the rod, 15, the inner surface of the vibrating cup being rearwardly inclined from the point 27, to form a seat for the packing ring, 28, which is inclined to slide on and fit the surface 27ᵃ of the vibrating cup, 26. The packing rings, 29 and 30, are located within the vibrating cup, 26, and back of the ring, 28.

The follower plate, 31, fits around the rod, 15, and is provided with a forwardly projecting portion, 31', pressing against the ring 30, as shown in Fig. 2. This follower plate, 31, is further provided with the rearwardly extending flange, 31'', forming a shoulder upon which is seated one end of coiled spring, 32, the other end of the spring being seated against the shoulder, 19, of chamber, 18. It will be apparent that the action of the spring is to press against the follower plate, 31, thereby compressing the rings, 30, 29 and 28 firmly into the vibrating cup, 26, and into contact with the piston rod, 15. The follower plate, 31, is further provided with the outwardly extending peripheral flange, 33, adapted to contact with the rear face of the vibrating cup, 26, after a certain amount of wear of the rings, thereby limiting the forward movement of the follower plate, 31. It will be apparent that as the piston rod moves inwardly in the cylinder, the frictional contact between the rings and the rod would normally tend to carry the rings inwardly. This is prevented by the spring, 32, and also by the fact that the peripheral flange, 33, is of greater external diameter than the diameter of chamber, 18, so that the said flange will contact with the outer face of the bolting flange 17.

As explained above, super-heated steam, when admitted through the opening 14, will tend to heat the metal rings as well as the piston rod, and this heat, together with that generated by the friction between the rings and rod, tends to melt the metal, or partial metal, rings, 28, 29 and 30. To obviate this danger, I provide a pipe or other duct, 35, shown as communicating at 10' with the boiler of the engine, with the locomotive boiler, 11. This pipe, 35, is connected by a coupling, 36, to the supply pipe, 37, which communicates with the interior of chamber 18. Saturated steam from the boiler may thus be supplied to the interior of chamber 18, and since in ordinary practice this saturated steam is maintained at about 380 degrees, and since it will become slightly cooled in traveling from the engine boiler to the chamber 18, it will be apparent that a cooling effect of greater than 260 degrees will be exerted, thereby decreasing the heat of the metal rings to considerably below the melting point. Furthermore, this admission at boiler pressure of the saturated steam will tend to prevent admission of super-heated steam at the higher temperature into the chamber, 18, thereby preventing the direct overheating of the rings, 28, 29 and 30. To provide for additional lubrication of the piston rod, 15, I provide an oil feed, 40, of conventional construction, having the pipe 41, communicating with the interior of pipe 35. This oil cup is provided with the usual valve, 41, operated by the handle, 42, whereby oil at any desired speed of feed may be admitted directly to the pipe, 35, from which it will be carried by the steam into the chamber 18, and will flow upon the piston rod, 15, thereby providing lubrication of the same when contacting with the packing rings. A check valve, 43, of any well-known construction, may be inserted in the pipe, 41, to permit the passage of oil therethrough, but to prevent the steam pressure from backing up through the oil cup 40.

It is to be understood that I have exaggerated the dimensions of several of the parts, in order to more clearly illustrate my invention, and I wish it understood that the supply pipe, 37, may be of any desired size to restrict the amount of saturated steam flowing therethrough. A valve 44 of any form may be provided in the pipe, 35, to regulate the flow of steam therethrough.

While I have shown and described my device with more or less particularity, I do not wish to be unduly restricted to such showing or description, beyond the scope of the appended claims.

What I claim is:

1. In a device of the class described, a cylinder, a cylinder head, a reciprocating piston rod extending through said cylinder head, said head being enlarged to form a chamber about said rod, means to prevent leakage of steam around said rod through said head, and means to supply saturated steam to said chamber.

2. In a device of the class described, a cylinder, a cylinder head, a reciprocating piston rod extending through said cylinder head, said head being enlarged to form a chamber about said rod, means to prevent leakage of steam around said rod through said head, and means to supply saturated steam and lubricant to said piston rod in said chamber.

3. In combination, a boiler adapted to generate steam, a cylinder, a cylinder head, a piston rod reciprocating in the said cylinder and extending through said cylinder head, said head being provided with a chamber surrounding said rod, a pipe communicating with said boiler and with said chamber, said pipe being adapted to supply saturated steam from the former to the latter.

4. In combination, a boiler adapted to generate steam, a cylinder, a cylinder head, a piston rod reciprocating in the said cylinder and extending through said cylinder head, said head being provided with a chamber surrounding said rod, a pipe communicating with said boiler and with said chamber, said pipe being adapted to supply saturated steam from the former to the latter, and means to regulate the flow of saturated steam through said pipe.

5. In combination, a boiler adapted to generate steam, a cylinder, a cylinder head, a piston rod reciprocating in the said cylinder and extending through said cylinder head, said head being provided with a chamber surrounding said rod, a pipe communicating with said boiler and with said chamber, said pipe being adapted to supply saturated steam from the former to the latter, and an oil supply communicating with said pipe and adapted to feed lubricating oil thereinto, to be conveyed with said steam to said chamber.

In testimony whereof, I have subscribed my name.

JOSEPH W. CRUZAN.

Witnesses:
F. A. SNYDER,
A. H. SUTHERLAND.